Dec. 10, 1929.   J. J. RYAN, JR   1,739,261
STEAM VALVE
Filed April 22, 1925

Inventor:
John J. Ryan, Jr.
By Parker & Carter
Attorneys.

Patented Dec. 10, 1929

1,739,261

UNITED STATES PATENT OFFICE

JOHN J. RYAN, JR., OF CHICAGO, ILLINOIS

STEAM VALVE

Application filed April 22, 1925. Serial No. 24,909.

This invention relates to a valve, and particularly to a valve for use in controlling steam. One application of my valve is in connection with steam radiators, and the form illustrated herewith is adapted for use particularly in combination with a steam radiator, although the invention is, of course, not limited to that association. One object of the invention is to provide a valve which will not be subject to leakage about the valve operating stem when the valve is open and steam or other material is passing through it. Other objects will appear from time to time throughout the specification and claim.

My invention is illustrated more or less diagrammatically in the accompanying drawing, wherein.

Like parts are designated by like characters throughout.

Figures 1, 2:
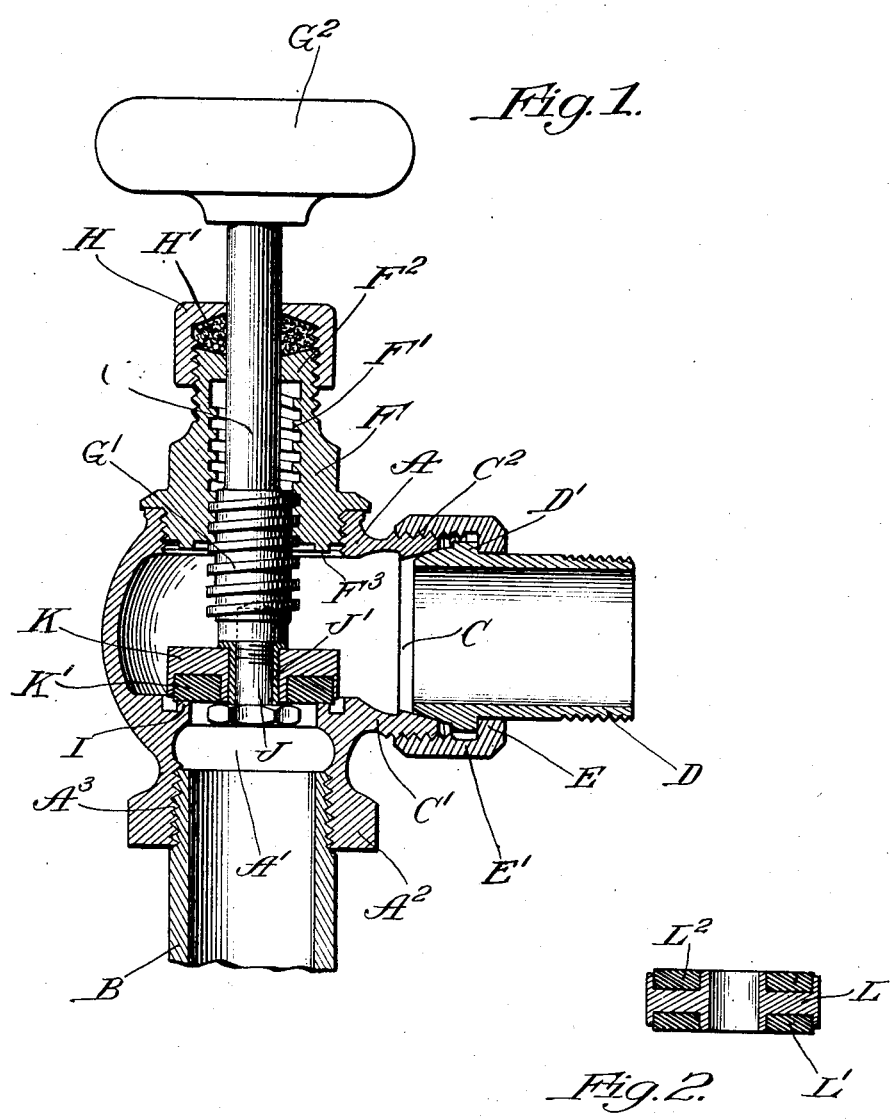
Figure 1 is a vertical cross section through my valve.
Figure 2 is a detail showing a modified form of the valve disc.

A is a valve housing having an intake opening $A^1$ through an elongated portion $A^2$ which is threaded on its interior as at $A^3$ to receive a pipe B. C is a discharge opening from the valve which leads through an extension $C^1$ threaded on its exterior as at $C^2$. D is a connection fastened to the discharge opening. In the form here shown it is provided adjacent one end on its outside with a flange $D^1$. This flange is engaged by a corresponding flange E on an engaging nut $E^1$, by means of which the connection D is seated and held securely in place.

Threaded into an opening in the upper part of the valve is a fitting F which has on its interior the threaded cavity $F^1$ within which is positioned and adapted to move the valve stem G. The stem is provided with an enlarged threaded portion $G^1$ which engages the threads $F^1$ on the interior of the member F. The upper end of the member F is reduced as at $F^2$ and adapted to receive a packing retaining gland H which holds packing $H^1$ about the valve stem G and against the upper part of the member F. On its interior within the valve housing the member F is preferably provided with a raised seat $F^3$. The valve housing itself is also preferably provided with a raised seat I, this seat being opposite the seat $F^3$.

At the upper end of the valve stem G is an operating handle $G^2$ by means of which the stem may be rotated to move it in and out.

Fastened in the inner end of the valve stem is a disc retaining member J. It has preferably mounted loosely about it a bushing $J^1$ upon which the valve disc K is mounted and adapted to rotate. The valve stem has a generally flat part movable upon the upper end of the bushing. The disc K is provided preferably in its lower face with a seating portion $K^1$ adapted to seat against the raised seat I. This seating portion $K^1$ may be of fiber, rubber, or any suitable material, the nature of which depends upon the type of valve and the material which is passing through it.

As shown in Figure 2 a somewhat modified valve disc L is provided. This disc is generally similar to the disc K but has a lower seating surface $L^1$ and a corresponding upper seating surface $L^2$ which is adapted to be seated against the valve seat $F^3$.

It will be understood that the two seats may be flush with the rest of the valve and need not be raised as shown, but generally it is preferable to have them raised. It will be understood also that the valve disc itself need not have any seating material set in, but may be simply a metallic or other unit metal disc.

As shown in Figure 1 the valve is closed. When it is desired to open it the handle is operated, the valve shaft or stem is rotated, and the valve moves upward, raising the valve disc from the seat and permitting entrance into the valve and discharge through it. It is in this condition when the valve is open that leakage through the valve stem outward is most likely to take place, and it is one of the prime objects of my invention to prevent this leakage. For this purpose the upper surface of the valve disc is provided with a seating face which may be of metal or any other suitable material and may be additional to the valve disc or integral with it. As the valve is opened it is moved upward to the full open position and the upper seating face on the valve seats against the inner end of the body F, either against the raised valve seat as shown in Figure 1 or else against the flat seat where the seat is not raised. In this position the valve disc is firmly seated and leakage from the interior of the valve housing out along the valve stem and controlling parts is prevented in just the same way that leakage and discharge out through the valve through the main opening is prevented when the valve is closed.

Although I have shown an operative device, still it will be obvious that many changes might be made in size, shape and arrangement of parts without departing materially from the spirit of my invention; and I wish therefore that my showing be taken as in a sense diagrammatic.

I claim:

In combination in a valve, a housing member provided with an intake and an outlet opening, a raised annular seat member about one such opening and a valve and valve closing member, a housing and supporting member for such valve closing member, such supporting member provided with a threaded perforation, the threads of such perforation adapted to engage corresponding threads on the valve closing member, such supporting member having about such perforation a raised annular seat, the valve closing member comprising a threaded stem means for rotating it, such stem carrying adjacent one end a bushing member adapted to provide a supporting and bearing portion for the valve, said valve closing member comprising a generally flat part movable upon such bushing.

Signed at Chicago, county of Cook, and State of Illinois, this 15th day of April, 1925.

JOHN J. RYAN, Jr.